March 7, 1944. A. E. CHERNACK 2,343,747
MACHINE FOR MAKING TUBULAR STRUCTURES
Filed May 27, 1941 6 Sheets-Sheet 1
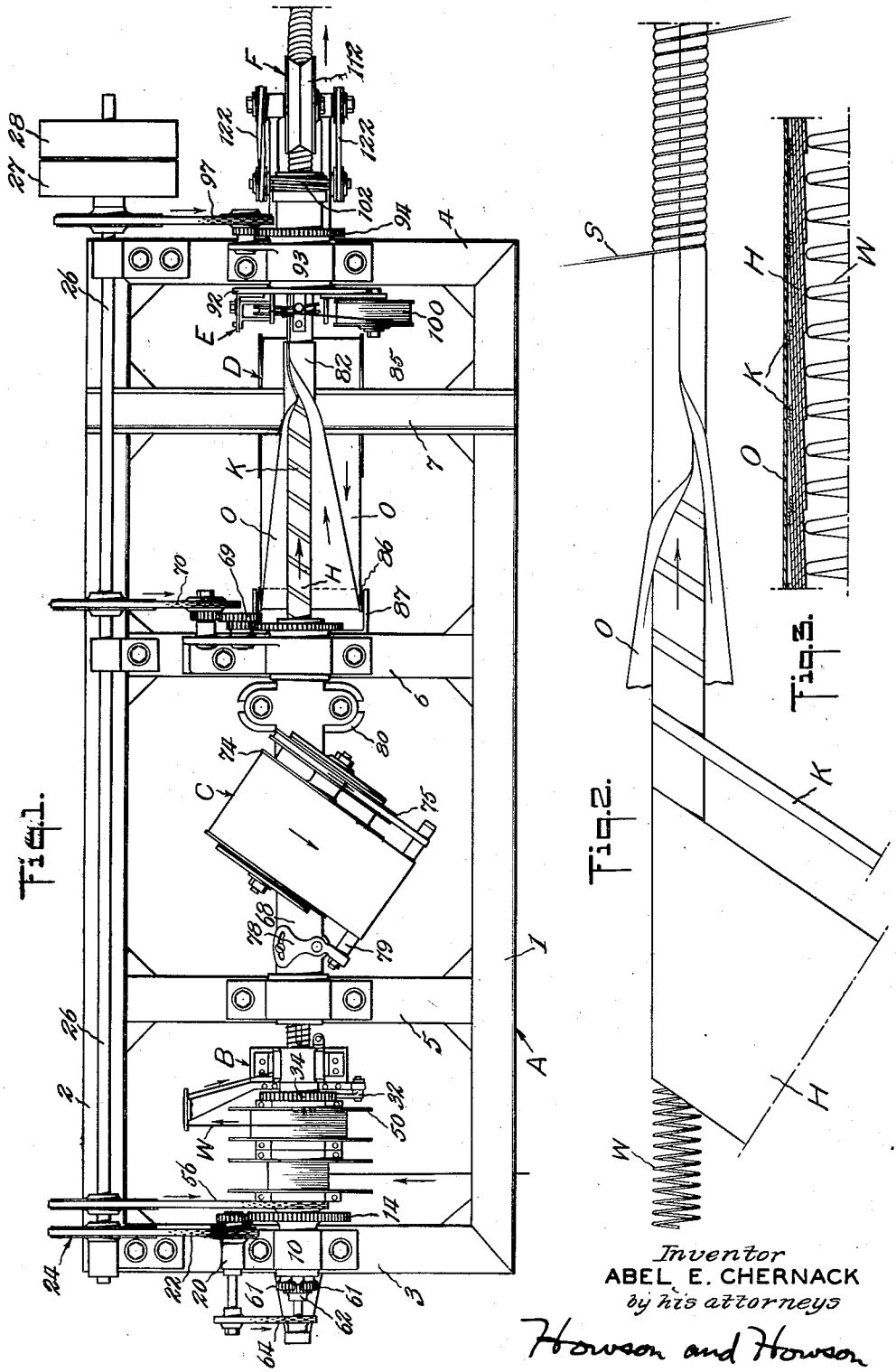
Inventor
ABEL E. CHERNACK
by his attorneys
Howson and Howson

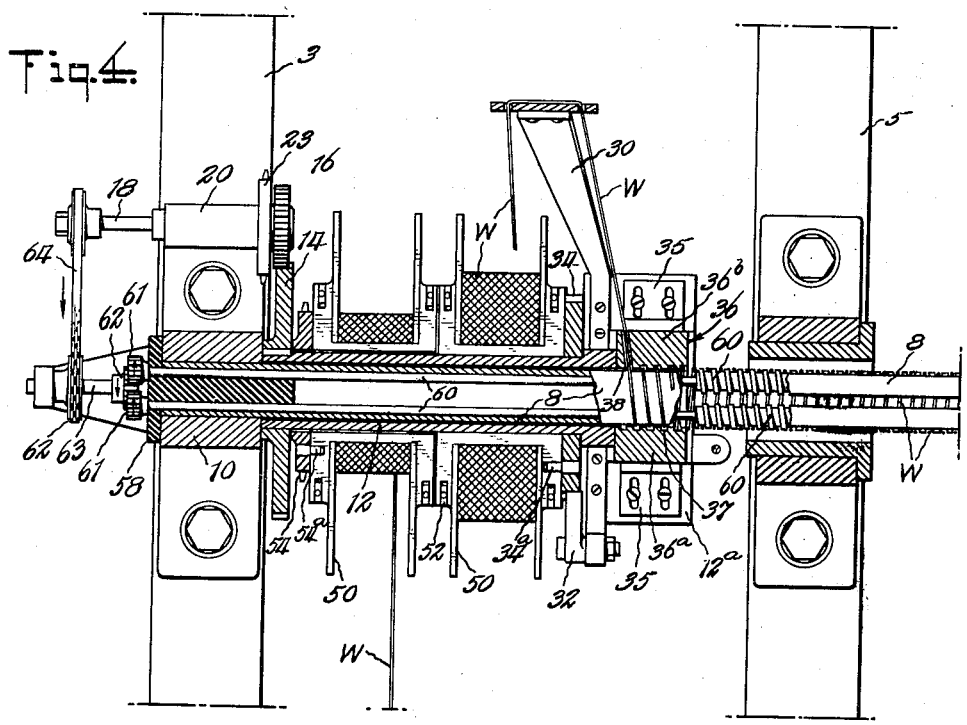
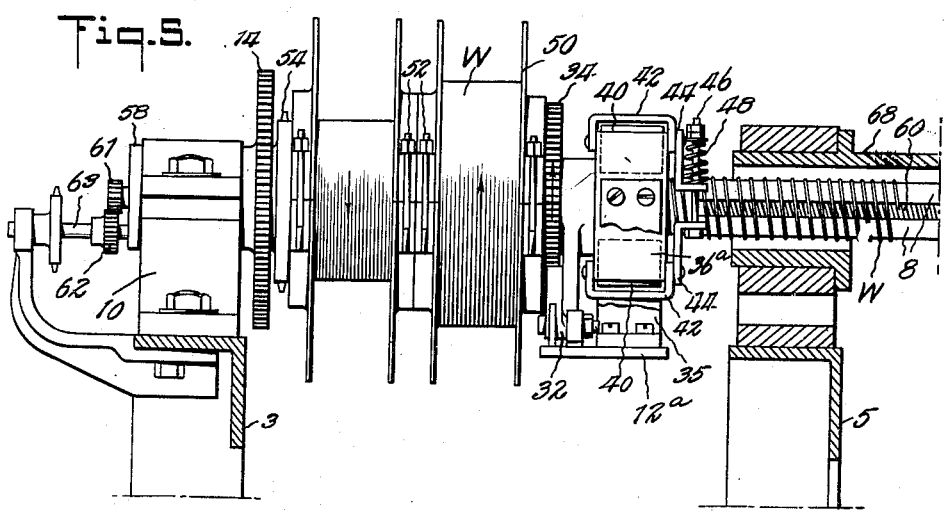

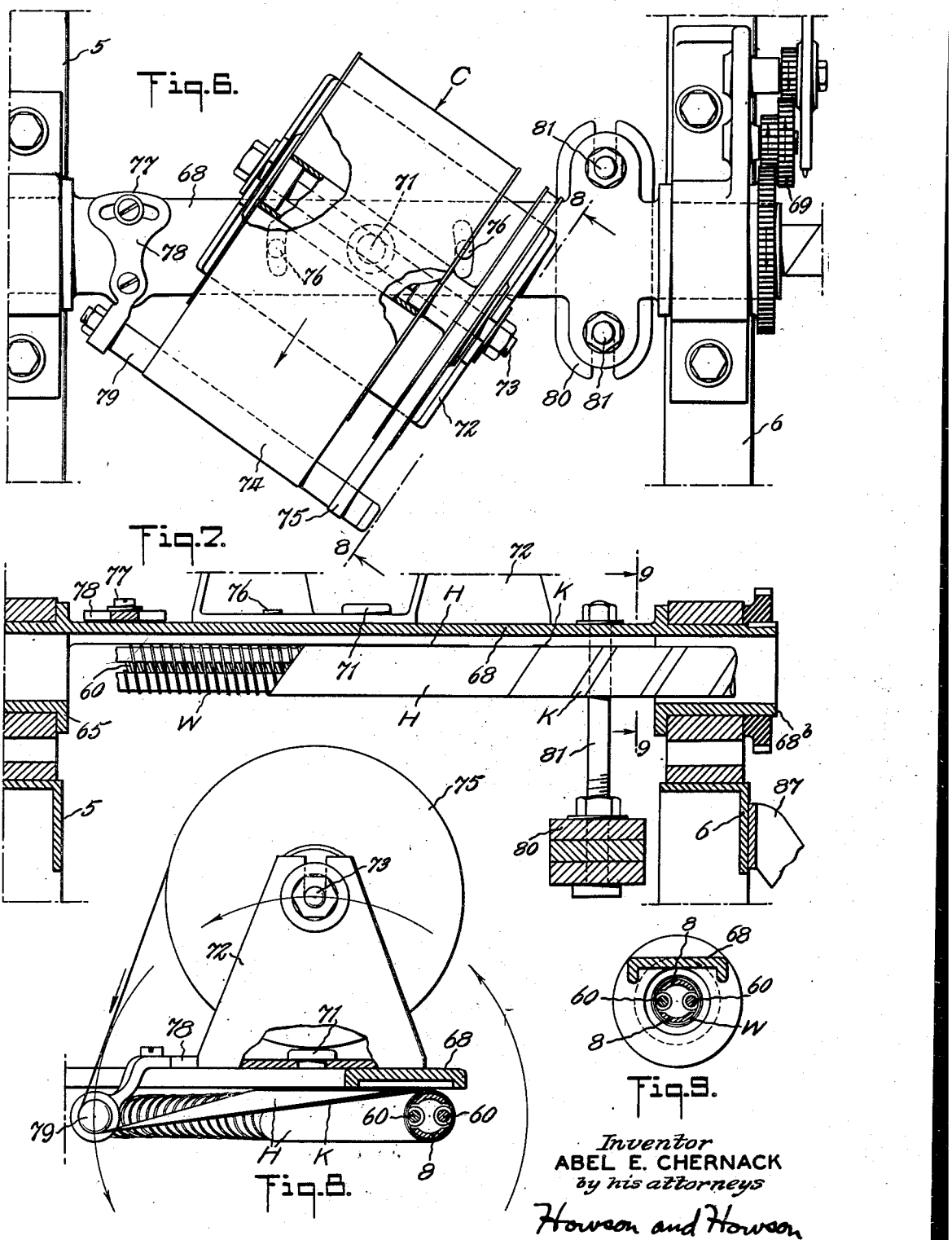

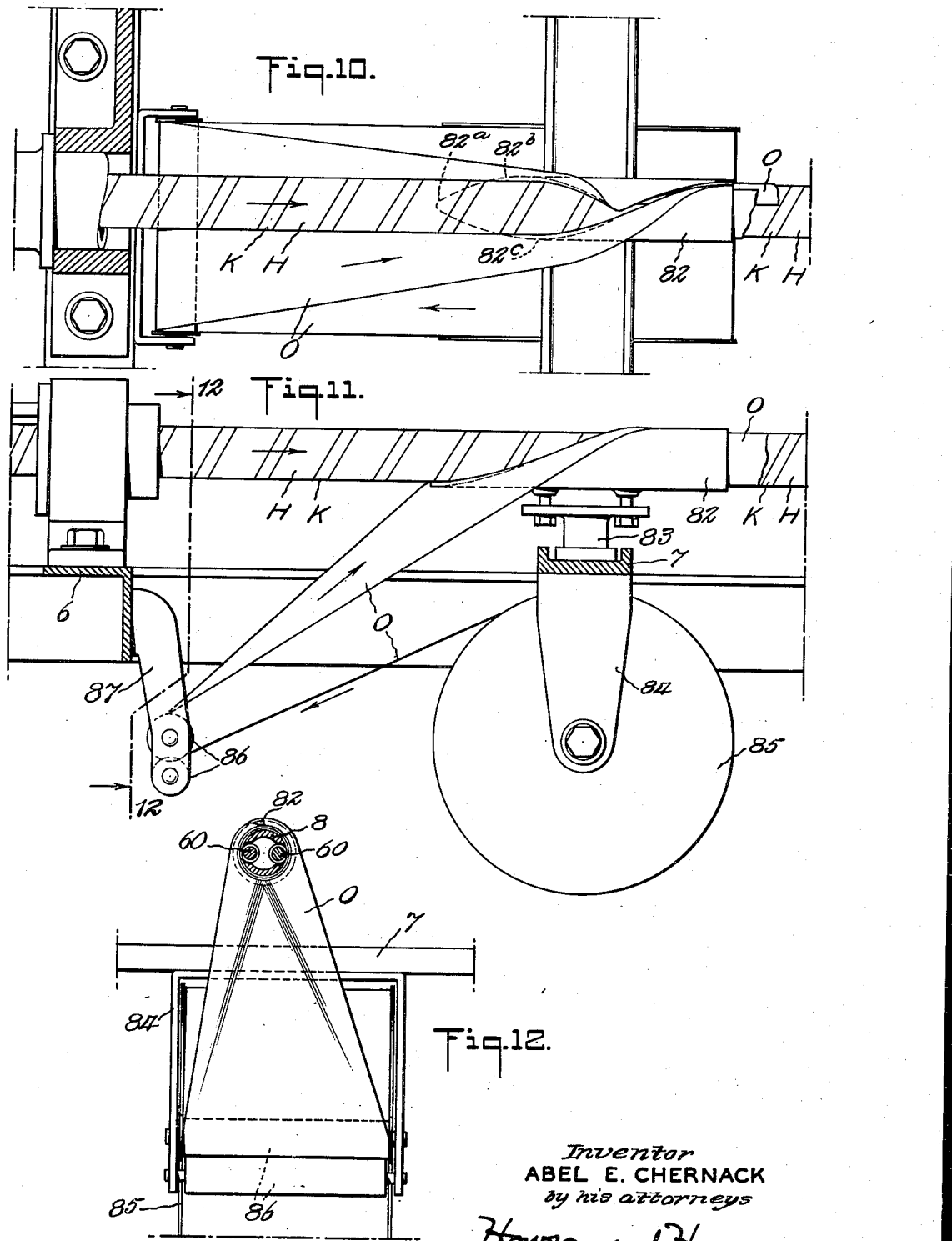

March 7, 1944.  A. E. CHERNACK  2,343,747
MACHINE FOR MAKING TUBULAR STRUCTURES
Filed May 27, 1941  6 Sheets-Sheet 5

Inventor
ABEL E. CHERNACK
by his attorneys
Howson and Howson

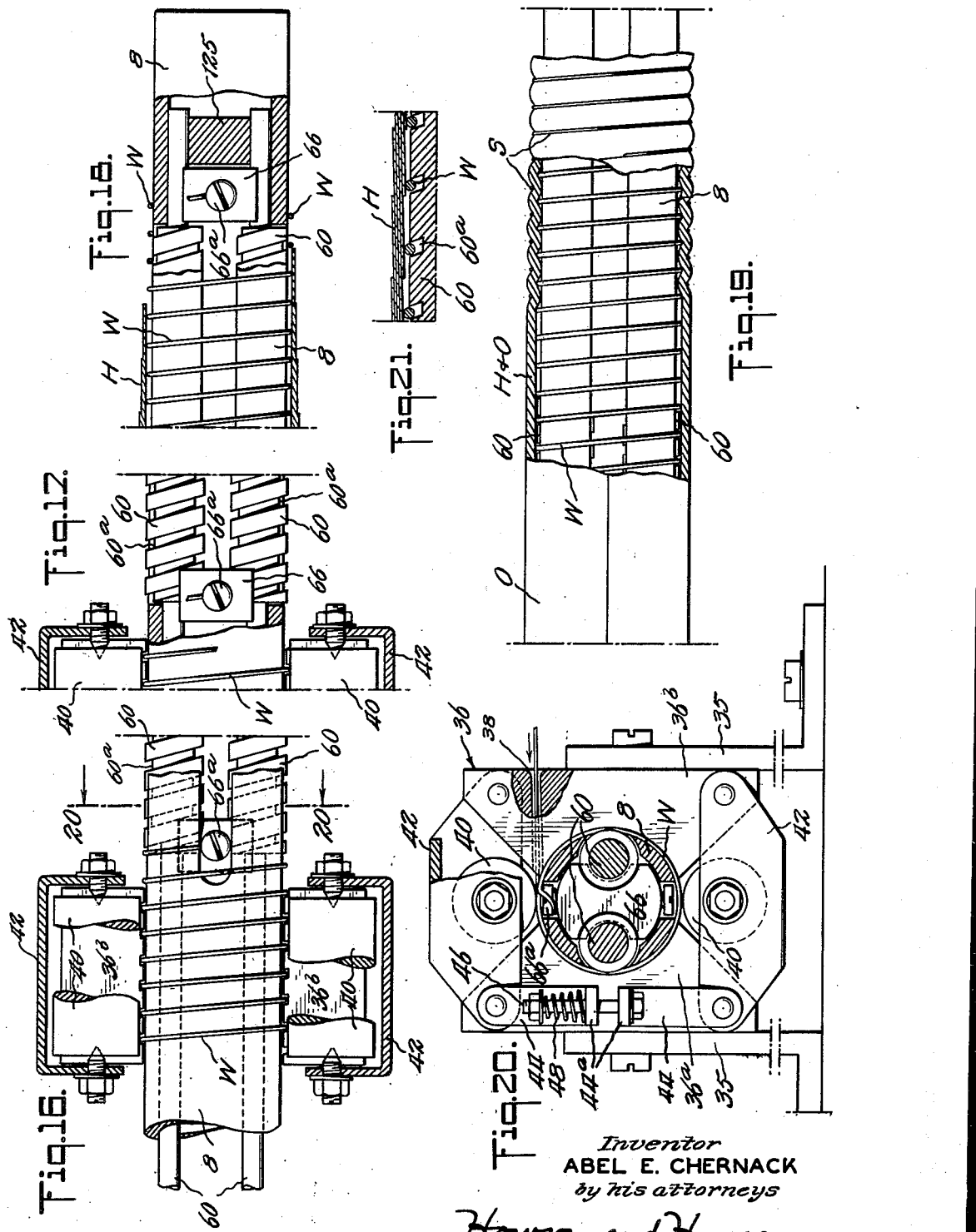

Patented Mar. 7, 1944

2,343,747

UNITED STATES PATENT OFFICE 2,343,747

MACHINE FOR MAKING TUBULAR STRUCTURES

Abel E. Chernack, New York, N. Y.

Application May 27, 1941, Serial No. 395,481

7 Claims. (Cl. 153—67)

This invention relates to machines for making tubular structures and more particularly to a machine for forming such structures by placing a suitable covering about a continuous wire spring and it is an object to provide a machine in which all steps of making such tubular structures may be carried out continuously by a single machine so a continuous length of the tubular structure is discharged from the machine. It is also an object of this invention to provide a machine of the class described in which the machine may be stopped to effect replenishment of the materials of which the tubular structure is formed and the machine restarted without necessitating a break in the length of the tubular structure manufactured by the machine and it is a further object of this invention to provide a machine in which the tubular structure is engaged during its manufacture and moved continuously in the machine as the various steps of the manufacture of the tubular structure are carried out.

In the drawings in which is illustrated a preferred embodiment of this invention—

Figure 1 is a plan view of a machine for forming a tubular structure in accordance with this invention;

Figure 2 is a diagrammatic view illustrating the successive steps in the forming of a tubular structure by a machine in accordance with this invention;

Figure 3 is a diagrammatic sectional view of a tubular structure formed by a machine in accordance with this invention, the section being shown of a tubular structure before the final binding of wire or cord is applied;

Figure 4 is a sectional view of the spring forming portion of the machine for forming tubular structures shown in Figure 1;

Figure 5 is a view in elevation of the spring forming portion shown in Figure 4;

Figure 6 is a view in elevation of the means for applying a covering to the spring formed by the mechanism shown in Figure 4;

Figure 7 is a vertical sectional view of the spool supporting means shown in Figure 6, the spool and portion of the spool supporting frame being omitted;

Figure 8 is a view partly in elevation and partly in vertical section taken as on line 8—8 of Figure 6;

Figure 9 is a partial vertical sectional view taken as on line 9—9 of Figure 7;

Figure 10 is a plan view showing the means for applying an outer covering in the forming of a tubular structure;

Figure 11 is a view in elevation of the mechanism shown in Figure 10;

Figure 12 is a vertical sectional view taken as on line 12—12 of Figure 11;

Figure 16 is a partial sectional view of the spring forming means of Figure 1, the section shown being angularly displaced from the section of Figure 1 and parts being broken away to show other parts more clearly;

Figure 17 is a fragmentary sectional view, similar to the view of Figure 16 but with additional parts broken away;

Figure 18 is a partial sectional view of the means for moving the spring from the spring forming means, the section being taken at the end away from the spring forming means;

Figure 19 is a view, partly in section showing a tubular structure made on a machine in accordance with this invention, the view being taken in the region in which the binding wire or cord is applied to the tubular structure;

Figure 20 is a sectional view of the spring forming means taken as on line 20—20 of Figure 16; and Figure 21 is a fragmentary sectional view showing the relation of the spring, the initial covering on the spring and the means for moving the spring from the spring forming means.

Figure 13:
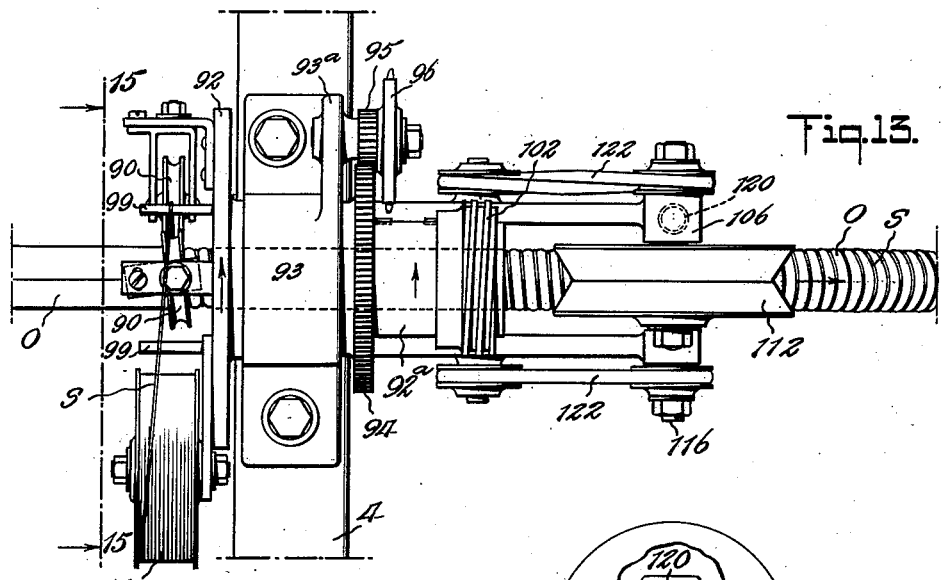
Figure 13 is a plan view of the mechanism for applying a binding wire or cord in a manner to maintain the tubular structure flexible and the rolls for guiding the completed tubular structure from the machine.

Tubular structures of the type intended to be manufactured on a machine constructed and arranged in accordance with this invention generally comprises an inner spiral coil of suitable spring wire to prevent flattening of the tube, one or more windings or coverings of suitable materials about the spring to provide a tube which, when desired may be liquid and gas tight, an outer or protecting covering when necessary or desired and an outer binding of cord or wire to retain the wrappings or coverings in place, the whole being suitably corrugated to render the completed tube flexible.

In the drawings the machine illustrated is arranged for the manufacture of a tube suitable for conveying air or gas under light pressure and having the inner spiral coil, an inner wrapping arranged to form a liquid and gas tight tube, an outer covering and an outer binding wire or cord.

For the continuous manufacture of a tube of such construction, a machine in accordance with this invention comprises a rectangular metallic frame A, suitably supported and having longitudinal members 1, 2, end members 3, 4 and transverse intermediate members 5, 6, 7. Mounted upon the frame A is a means B for forming the inner spiral wire coil or spring of the tube; a means C for placing a gas and liquid tight wrapping about the coil spring to form a tube; a means D for placing an outer or protecting wrapping on the tube; a means E for corrugating the tube and placing a binding wire or cord about the tube; and guiding and draw-off roller F for guiding the finished tube away from the machine.

The means B for forming the spiral coil spring comprises a tube or sleeve 8 having an end thereof clamped against rotation in a bearing or bracket 10 mounted on the end member 3. The sleeve 8 is formed as a complete cylinder for a portion of its length and on said complete cylindrical portion a second sleeve 12 is rotatably mounted. Adjacent the bearing 10 the sleeve 12 has keyed thereon a gear 14 which engages a pinion 16 fixed on a shaft 18 journalled in a bearing 20 mounted on the end member 3. The shaft 18 is driven by chain 22 and sprockets 23, 24 from a shaft 26 journalled in suitable bearings mounted on the member 2 of the frame A, the shaft 26 being provided at one end with the usual fast and loose pulleys 27, 28, respectively. At its end remote from the gear 14, the sleeve 12 has a bracket 12ª secured thereon so as to rotate with the sleeve 12 and serving as a support for a wire guide arm 30 and a pawl 32, the pawl 32 being positioned to engage a ratchet wheel 34 journalled on the sleeve 12. Also mounted on the bracket 12ª are angle members 35 which are slotted to permit of their adjustment on the bracket 12ª and which serve to support the halves 36ª and 36ᵇ of a split nut 36 which fits about the fixed sleeve 8.

The split nut 36 has a spiral groove 37 formed on the inner surface thereof, the groove being of sufficient depth to accommodate the wire used to form the spring in the tube and of the pitch it is desired to have the coils of the spring. Through one-half of the nut 36 there is formed a bore 38 through which the wire W is led from the wire guide arm 30 to the groove 37. The adjacent surfaces of the halves 36ª and 36ᵇ of the nut 36 are cut away to form tapered slots in which are placed rollers 40 rotatably mounted in trough-shaped members 42 having an end thereof pivotally connected to the nut half 36ᵇ. Members 44 pivotally connected to the opposite ends of the members 42 have perforated lugs 44ª receiving a bolt 46. A spring 48 confined between a nut on the bolt 46 and one lug 44ª serves to draw the members 42 together and to force the rolls 40 against the wire spring coiled about the sleeve 8.

The wire W is supplied from a spool or bobbin 50 rotatably mounted on the sleeve 12 and formed of two half-sections held together by bolts 52. One section, on the side adjacent the ratchet wheel 34 is provided with a recess to receive a pin 34ª fixed in the ratchet wheel 34. As shown in Figures 1, 4 and 5, the wire W is fed from the right hand spool or bobbin to the wire guide arm 30 and split nut 36 to form the spring and when the spool is empty the machine is stopped, the halves of the spool separated and removed from the machine and the left hand spool or bobbin, which has been filled meanwhile, is slid to the right along the sleeve 12 to engage with the pin 34ª in ratchet wheel 34 and have the end of its wire secured to the end projecting from the wire guide 30. The halves of the empty spool are then placed on the sleeve 12 at the left of the full spool with recesses in the meeting faces of the halves aligned to form a recess which receives a pin 54ª in a sprocket 54. The halves of the empty spool are then secured together by the bolts 52 and the wire engaged with the spool for winding on the spool. The empty spool is revolved to wind the wire thereon by means of a chain 56 which engages the sprocket 54 and is operated by a sprocket fixed on the shaft 26. As shown, the empty spool is separately driven and rotated independently of the sleeve 12 in order that the wire may be wound in the proper direction for unwinding by rotation of the wire guide arm 30, split nut 36 and pawl 32.

Secured to the outer end of the bearing or bracket 10 is a plate 58 having a lug thereon which projects into the sleeve 8, the plate 58 and its lug being bored to provide journals for shafts 60. Gears 61, fixed on the ends of the shaft 60 are engaged by a gear 62 fixed on a shaft 63 which is driven by means of a chain 64 engaging sprockets fixed on the shafts 18 and 63. The gears 61, engaging the same gear 62, cause the shafts 60 to be rotated in the same direction. The shafts 60 are of uniform diameter from their ends with the gears 61 to a point slightly beyond the split nut 36 where the diameter of the shafts is increased and they are formed with grooves or threads 60ª which receive the wire W. The shafts 60 are so positioned in the sleeve 8 that the grooved portions of the shafts project through diametrically positioned slots in the sleeve 8 which is of slightly reduced diameter from this point on, so as to engage with the wire W. The pitch of the grooves 60ª and the speed of rotation of the shafts 60 are such that the grooves 60ª shift the coils of the wire W along the sleeve 8 at the speed at which the coils are formed and advanced by the split nut 36 so the spring coils are not extended or compressed and the spring remains of uniform diameter and pitch. Slidably mounted in the sleeve 8 is a nut 66 threaded to engage with the threads 60ª on the shafts 60 so as to be shifted thereby. At opposite sides, the nut 66 is provided with threaded openings to receive flat headed screws 66ª which engage in diametrically positioned slots in the sleeve 8, these slots being spaced 90° from the slots for the shafts 60. A screw 66ª serves to secure the end of the wire W to the nut 66 after the wire has been threaded through the nut 36 and while the end of the wire spring is being advanced by the grooves 60ª.

To place a wrapping on the wire spring so as to form a tube there is provided a shallow channel-shaped member 68 having formed integral therewith annular journal portions 68ª, 68ᵇ through which extend the sleeve 8 and shafts 60 and which are rotatably supported in suitable bearings in the frame members 5 and 6. A gear 70, fixed on the journal portion 68ᵇ and driven through a reduction gearing 69 from the shaft 26 by means of a chain 70 and suitable sprockets, serves to rotate the member 68 in its bearings and about the sleeve 8 and the wire spring coiled thereabout. Pivotally mounted on the member 68 by a bolt 71 is a frame 72 having slotted side members adapted to receive a rod 73 which rotatably supports a spool 74 of a suitable wrapping material H, as Cellophane, and a spool 75 of a suitable adhesive tape K for sealing the wrapping along the exposed edge thereof. Nuts and washers threaded onto the rod 73 provide a means for holding the spool 75 in the bracket. Suitable means for tensioning the wrapping and preventing over-running of the spool during the wrapping operation are provided. Screws 76 passing through curved slots in the base of the frame 72 and threaded into openings in the member 68 serve to retain the frame 72 in adjusted position. Pivotally mounted on the member 68 and held in adjusted position by a screw 77 is a bracket member 78 which carries a guide roller 79 for the material from the rolls 74 and 75. As shown, the width of the spool 75, its angular relation to the axis of the spiral wire spring and its speed of rotation about the wire spring are such that a 4-ply winding is placed upon the spring coils but by varying one or more of these factors, wrappings of different pitch and number of plies may be placed upon the spring. To counterbalance the spool and its supporting frame, weights 80 secured to the member 68 by bolts 81 may be used. It is to be understood that, while but a single wrapping means has been shown, one or more additional wrapping means, wrapping in the same or opposite directions may be used and that the pitch of the various windings and the number of plies thereof may be different. To place an outer or protecting wrapping on the tube formed by the wrapping means of Figures 6 to 9, the tube after passing through the journal portion 68b of the member 68 passes through a short split tube 82 fixedly supported upon a stand 83 carried by the frame member 7. Suspended from the frame member 7 is a frame 84 supporting a roll 85 of material O suitable for the outer or protecting wrapping or covering. The covering material O is of sufficient width to form a roll covering, with the desired overlap, the tube formed by the first wrapping H and the spring W. The covering material O as it is fed from the roll 85 passes between guiding rolls 86 supported in a frame 87 carried by the frame member 6 and then between the split tube 82 and the hose or tube to be covered. The split tube 82 is cut away so as to present a point 82a to the material O from the roll 85, the sides of the point diverging at an angle of 60°, 30° to each side of the axial plane of the split tube passing through the point, and the split in the tube extends along the line of one of the sides of the point. The material O is fed to the split tube so that sufficient material to wrap one-half the formed tube is engaged by the short edge 82b of the point while sufficient material to wrap the other half of the formed tube and to provide the desired overlap of the material O is engaged by the other edge 82c which is continued directly into the split in the tube. As shown in Figure 10, as the formed tube and material O travel through the split tube 82, the short side 82b rolls the material O against one-half of the formed tube while the other side 82c rolls the material O against the other half of the tube and rolls the overlapping material into position over the material on the first half of the formed tube.

To render the tubing flexible the wrappings are corrugated by pressing them inwardly between the coils of the wire spring W and they are secured in this position by a securing wire or cord placed in the depression. This is accomplished by a plurality of grooved rollers 90 secured to a plate 92 having a hollow journal portion 92a mounted in a suitable bearing 93 on the frame member 4 and through which journal portion the tube is passed. The rollers 90 are positioned so as to press the wrappings inwardly on opposite sides of the wire spring W and are rotated at a speed such that the rollers follow the turns of the spring W as the tube is moved through the journal portion 92a. The plate 92 and rollers 90 are rotated by means of a gear 94 fixed on the journal portion 92a and engaging a pinion 95. The pinion 95 is attached to a sprocket 96 and both are mounted on a stub axle supported in an ear 93a formed integral with a part of the bearing 93. A chain 97 engaging the sprocket 96 and a suitable sprocket on the shaft 26 drives the pinion 95 from the shaft 26. Also mounted on the plate 92 is a bracket 98 carrying a spool 100 of wire or cord S which is led over suitable guides 99 and to the tube just in advance of one of the rollers 90. In applying the cord or wire S the cord or wire is secured to the tube before rotation of the plate 92 is started and then, as the plate 92 is rotated, the cord or wire S is laid in the groove formed by the rollers 90, the turning of the spool 100 being suitably braked to place the cord or wire S under the desired tension. In order that the cord or wire S may be so placed on the formed tube that it will maintain the desired depth of corrugation in the tube when the tube is withdrawn from the machine the diameter of the shafts 60 is reduced at this point so that the surfaces of these shafts are flush with the surface of the sleeve 8, as shown in Figure 18, the nut 66, however, is still engaged by the threads on these shafts and is carried on outwards in the sleeve 8.

Figure 14:
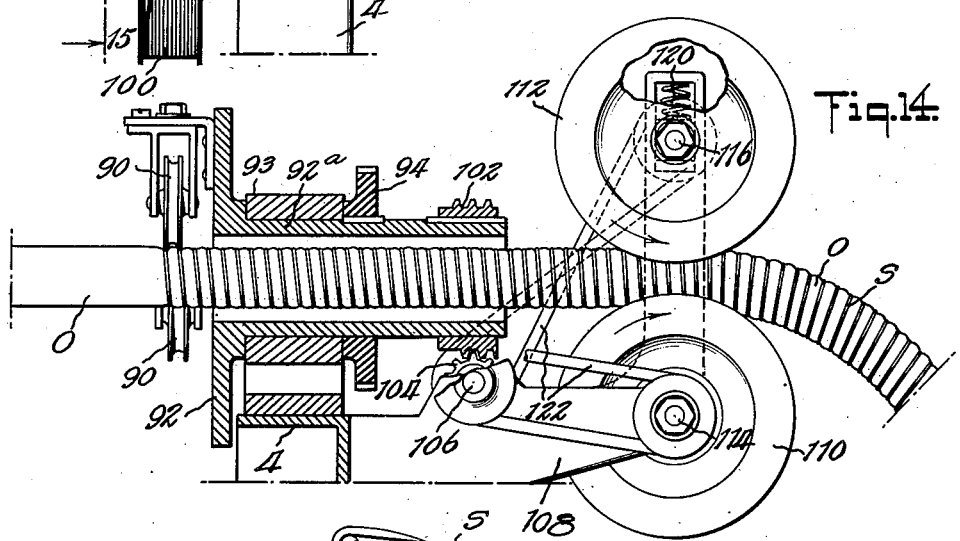
Figure 14 is a vertical sectional view of mechanism shown in Figure 13.
Figure 15:
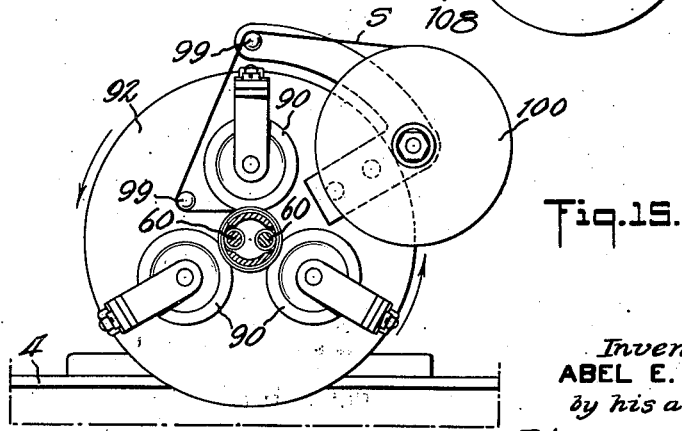
Figure 15 is a vertical sectional view taken as on line 15—15 of Figure 13 and showing in elevation the means for applying the binding cord or wire.

As shown in Figures 13 and 14, the journal portion 92a extends outwardly beyond the gear 94 and adjacent its outer end has secured thereon a worm 102 which engages a gear 104 fixed on a shaft 106. The shaft 106 is mounted in a bracket 108 carried by the frame member 4. Also carried by the bracket 108 are guide rollers 110 and 112, the roller 110 being fixed on an axle 114 held in fixed position in the bracket while the roller 112 is fixed on an axle 116 carried in bearing blocks 118 slidably mounted in the bracket and biased to their lowermost positions by springs 120. Belts 122 engaging pulleys fixed on the axles 106, 114 and 116 serve to drive the rollers 110 and 112 from the axle 106, one belt being crossed so that the rollers are turned in opposite directions and serve to lead the finished tube from the machine.

The sleeve 8 extends substantially to the plane of the axes of the axles 114 and 116 so that the outer end of this sleeve is supported by the rollers 110 and 112. The shafts 60 extend substantially to the end of the sleeve 8 and have ends of reduced diameter and without the threads 60a journalled in a bearing block 125 fixed in the sleeve 8. The nut 66, in the operation of the machine, is carried along by the threads on the shafts 60 until it passes to the plain end portions of the shafts 60 where it remains until it is necessary to return the nut 66 to the split nut 36 to again start up the machine.

When the machine is to be started, assuming the various spools to be filled, the split nut 36 is released, the parts moved away from the sleeve 8 and the wire W led through the guide arm 30 and guide opening in the nut half 36b and wrapped about the sleeve 8 to fit in the groove formed in the nut 36, the sleeve 8 serving as a mandrel about which the spiral spring is formed. The halves of the nut 36 are then brought together with the wire W in the groove in the nut 36 and the end of the wire is drawn taut and secured to the nut 66 by a screw 66ª. The machine is then operated slowly to form the wire spring and the spring W is carried along by the groove of the split nut 36, the grooves of the shafts 60 and the nut 66. After the wire spring W extends beyond the wrapping means C that means is started to place the initial wrapping H upon the wire. The section of the bare wire spring W and a length of the tube formed by the initial wrapping H thereon are then moved past the means D for applying the outer covering O to the tube by the continued operation of the machine and then the application of the outer covering is started. Continued operation of the machine then brings the first portion of the tube having the outer covering thereon between the rollers 90 and these rollers are then started to corrugate the tube and apply the binding wire or cord S. During this starting-up operation the nut 66 with the end of the wire W attached thereto approaches the plain end sections of the shafts 60 adjacent the rollers 110 and 112. At this time the machine is stopped and the end of the wire W released from the nut 66 and secured to prevent uncoiling of the spring W while the spring is guided between the rollers 110 and 112.

When during the operation of the machine a spool becomes empty, the machine is stopped, a loaded spool supplied and the end of the material thereon attached to the end of the material from the empty spool so that the starting-up operation requiring the nut 66 to be returned to the split nut 36 occurs but infrequently.

While in the foregoing description the use of particular materials has been indicated, it is to be understood that machines constructed in accordance with this invention are not limited to the use of such materials, but may be used with any and all suitable materials, the material varying with the purpose for which the tube is used. It is also to be understood that while particular methods of applying the wrapping or coverings have been shown the invention is not to be limited to such methods, the combination of such methods or the particular order in which such methods of applying the wrapper or covering are used in forming the tube of this description.

What I claim is:

1. In a machine for forming tubular structures, a fixed mandrel, means for forming a continuous metallic spiral on said mandrel, a spool rotatably mounted coaxial with said mandrel for supplying metallic material to said means, a second spool rotatably mounted coaxial with said mandrel and means for operating said second spool to wind metallic material thereon.

2. In a machine for forming tubular structures, a fixed hollow slotted mandrel, means rotatable about said mandrel for forming a continuous spiral spring on said mandrel and a rotatable threaded shaft in said mandrel, said threaded shaft projecting through a slot in said mandrel and engaging the spring for advancing the spring on said mandrel.

3. In a machine for forming tubular structures, a fixed hollow slotted mandrel, means rotatable about said mandrel for forming a continuous spiral spring on said mandrel and a rotatable threaded shaft in said mandrel, said threaded shaft projecting through a slot in said mandrel and engaging a plurality of the coils of the spring for maintaining the spacing of the coils while advancing the spring along said mandrel.

4. In a machine for forming tubular structures, a fixed hollow slotted mandrel, means rotatable about said mandrel for forming a continuous spiral spring on said mandrel and a plurality of rotatable threaded shafts in said mandrel, said shafts projecting through slots in said mandrel and engaging circumferentially spaced portions of the spring for advancing the spring on the mandrel and maintaining the spacing of the spring coils.

5. In a machine for forming tubular structures, a fixed hollow slotted mandrel, means rotatable about said mandrel for forming a continuous spiral spring on said mandrel, a plurality of rotatable threaded shafts in said mandrel, said shafts projecting through slots in said mandrel and engaging circumferentially spaced portions of the spring for advancing the spring on said mandrel and means slidably mounted in said mandrel and advanced in said mandrel by said shafts for holding an end of the spring.

6. In a machine for forming tubular structures, a fixed hollow slotted mandrel, means rotatable about said mandrel for forming a continuous spiral spring on said mandrel, a threaded shaft rotatable in said mandrel and projecting through a slot in said mandrel to advance the spring on the mandrel and means movable along said mandrel by said shaft for carrying a spring end along the mandrel.

7. In a machine for forming tubular structures, a fixed mandrel, a threaded nut rotatable on said mandrel for forming a continuous metallic spiral on said mandrel, a spool rotatably mounted coaxial with said mandrel for supplying metallic material to said nut and means for starting rotation of said spool with said nut.

ABEL E. CHERNACK.